May 18, 1937. C. A. MISEREZ 2,080,984
APPARATUS FOR ATTACHING FASTENERS
Filed Jan. 21, 1935 8 Sheets-Sheet 1
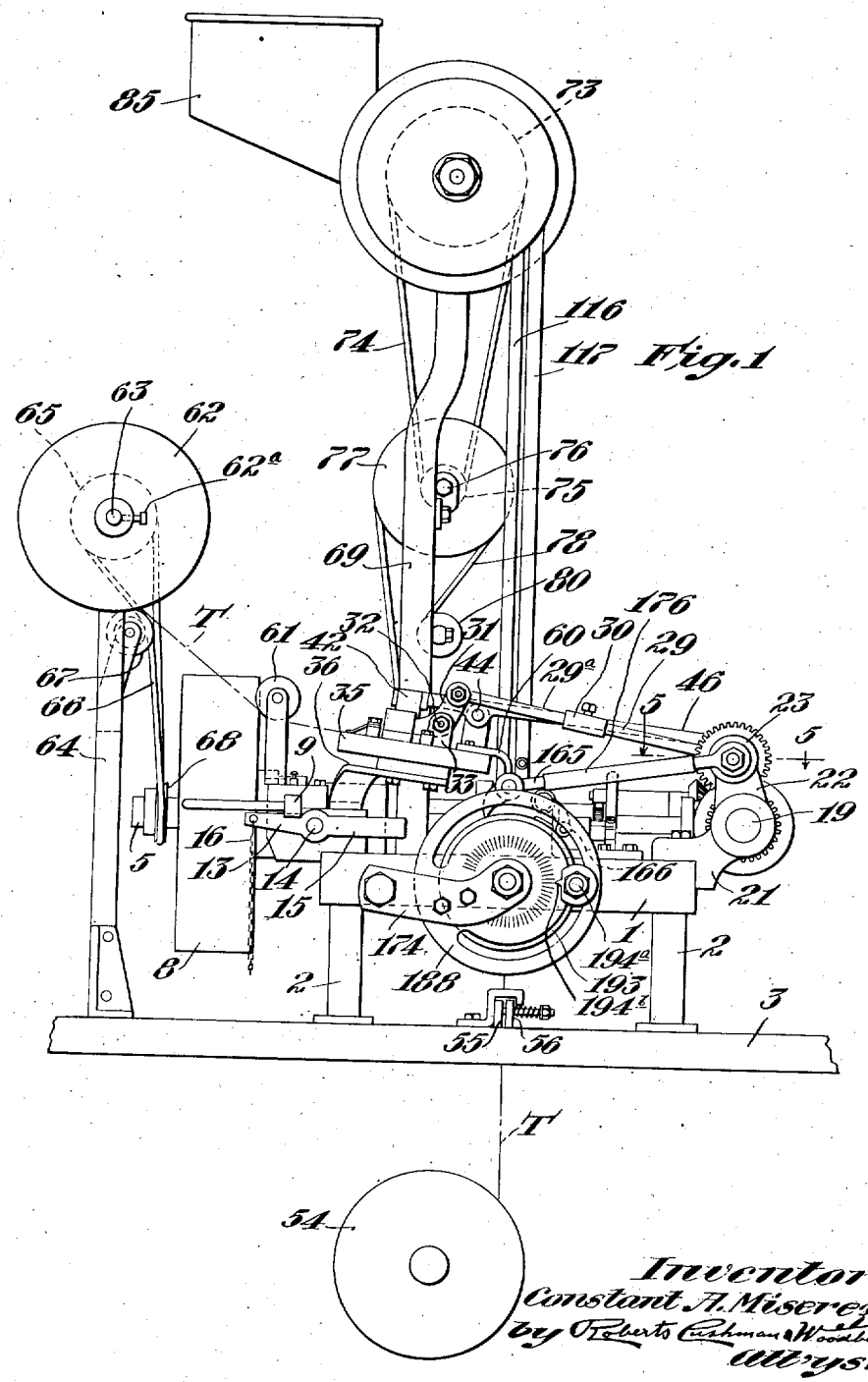

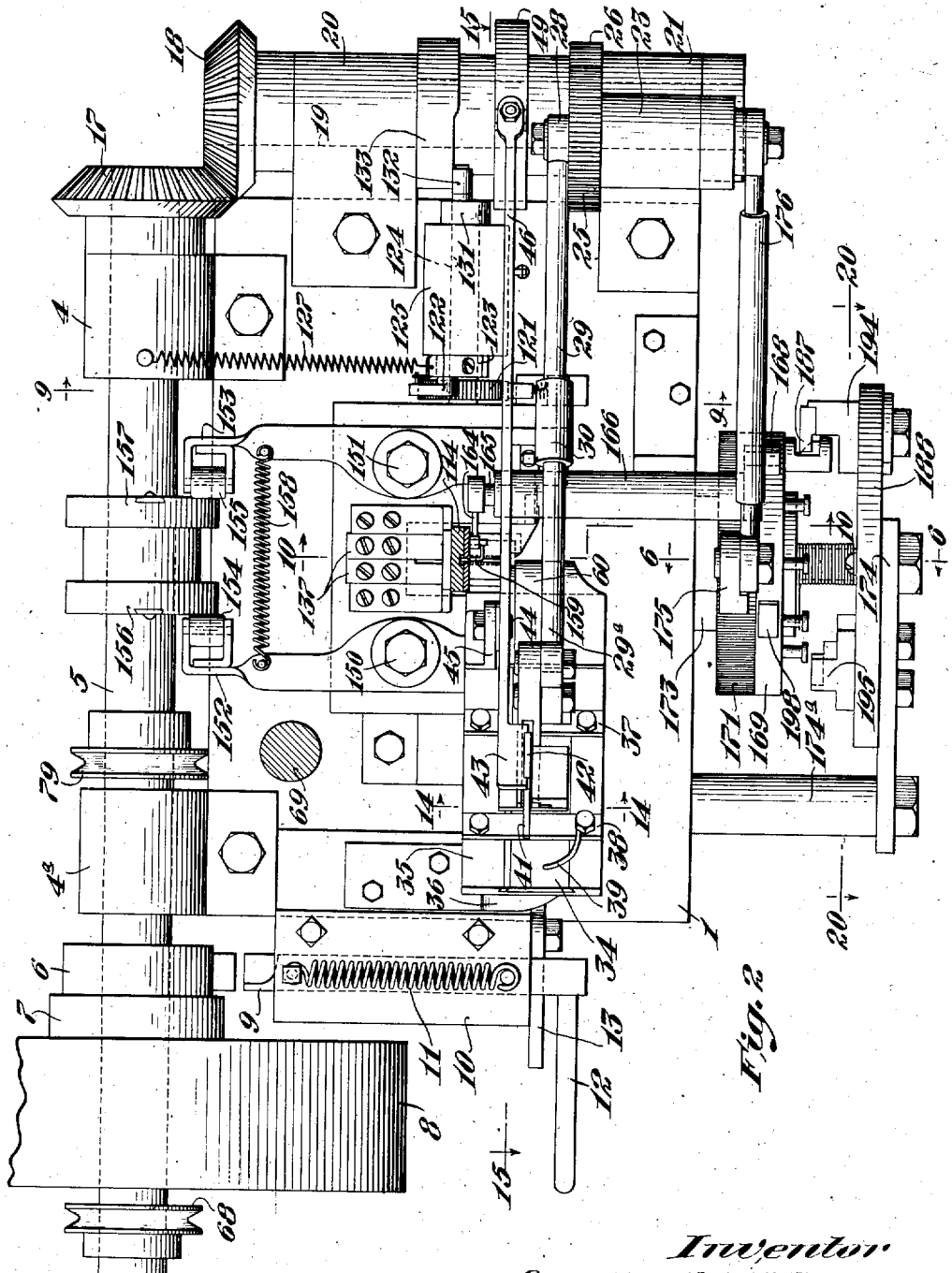

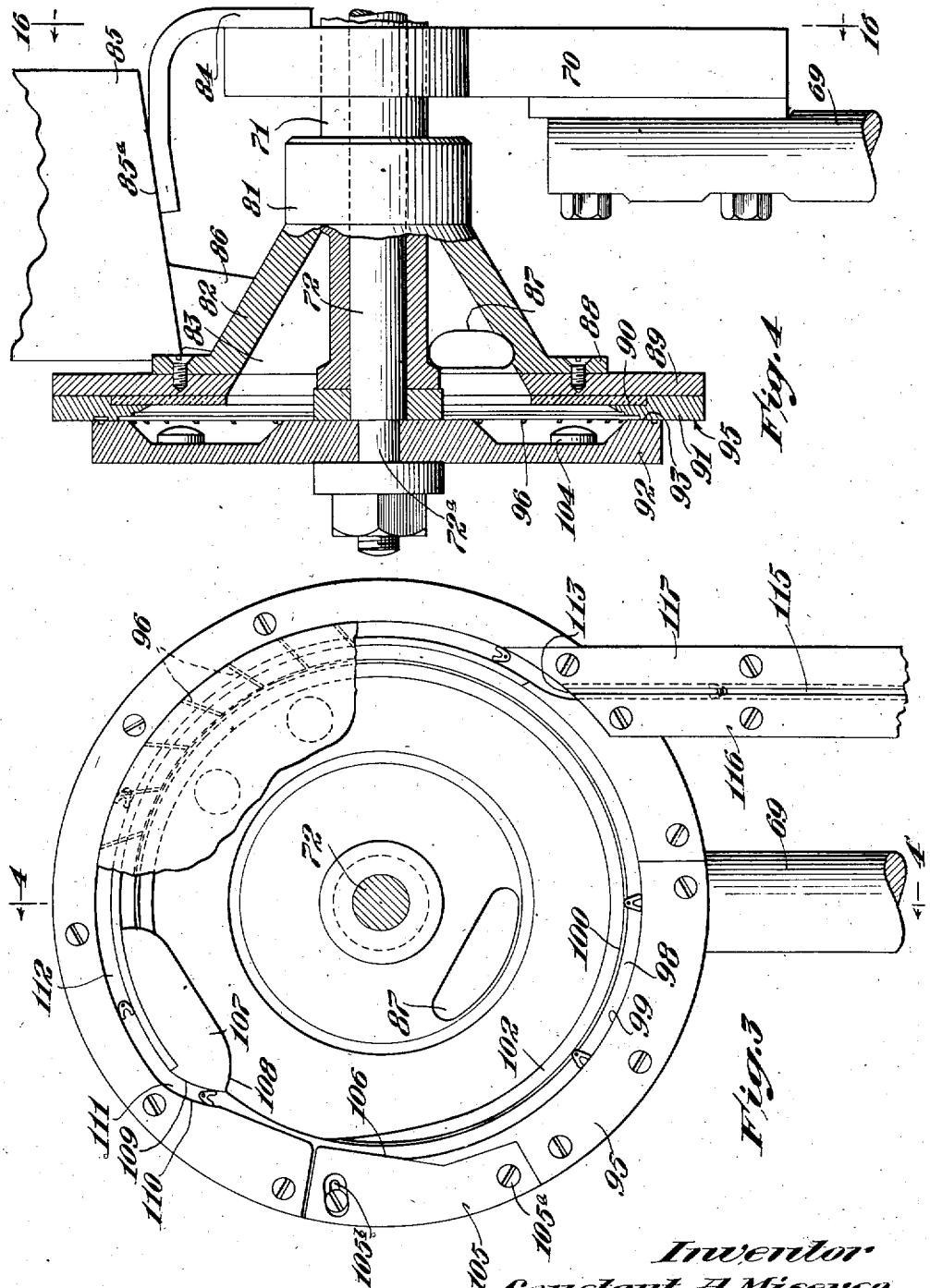

May 18, 1937.  C. A. MISEREZ  2,080,984
APPARATUS FOR ATTACHING FASTENERS
Filed Jan. 21, 1935  8 Sheets-Sheet 4
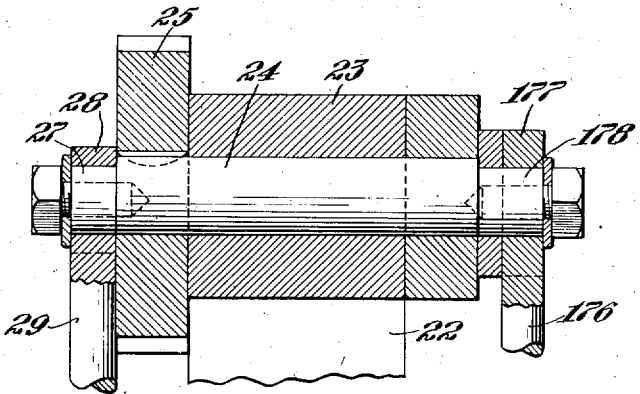
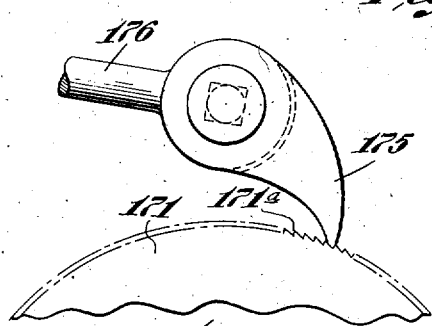
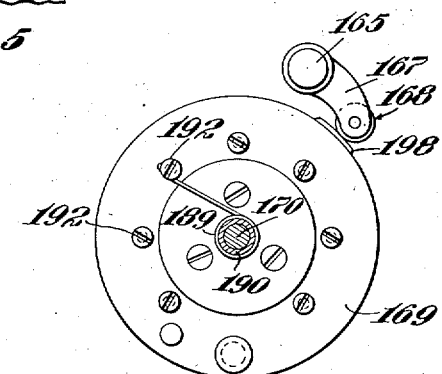
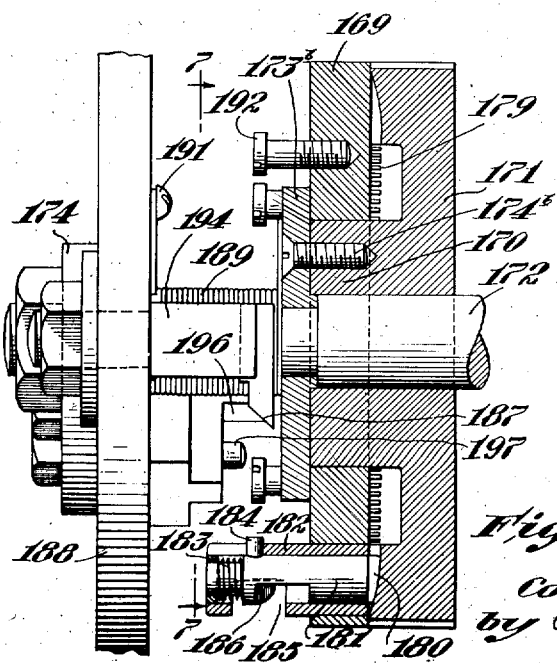
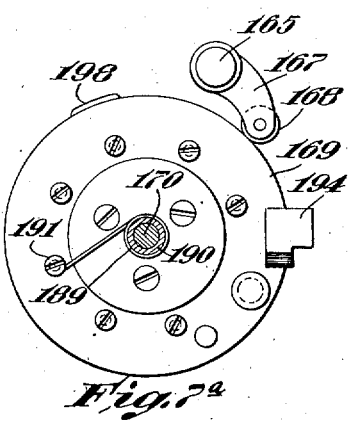
Inventor
Constant A. Miserez
by Roberts Cushman Woodbury
Attys.

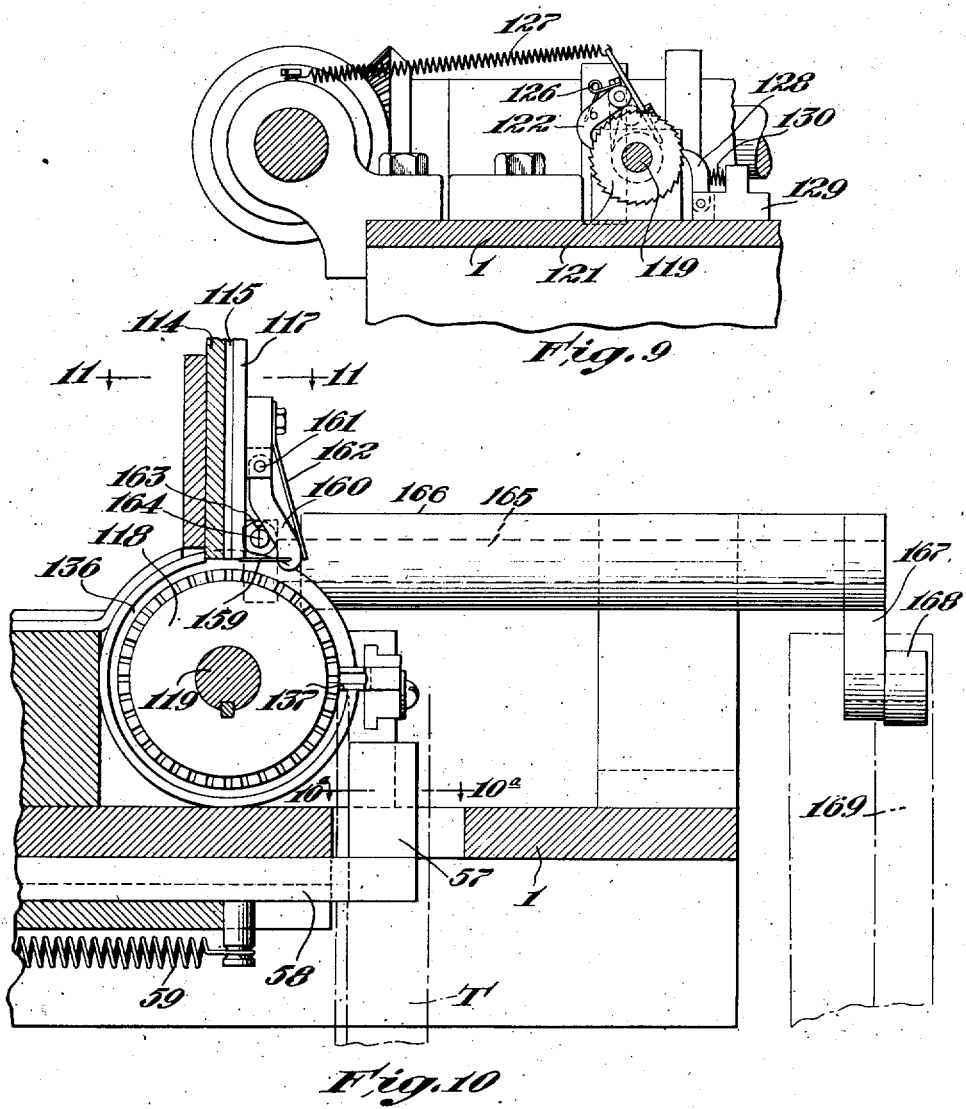
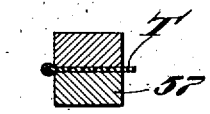

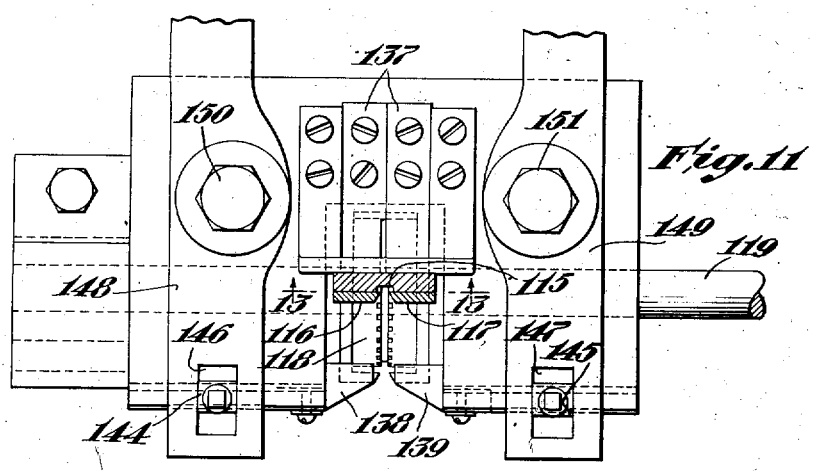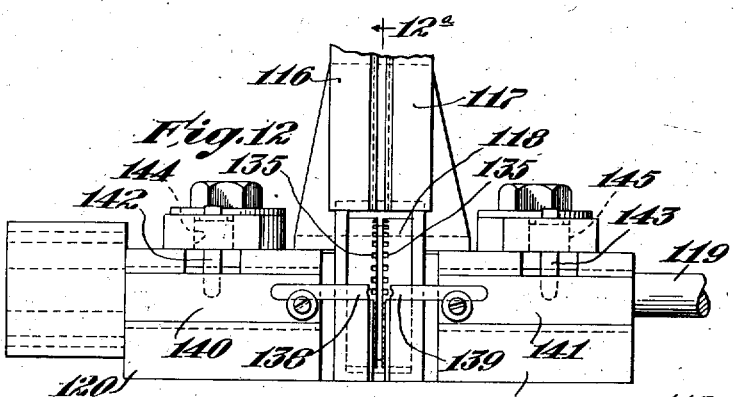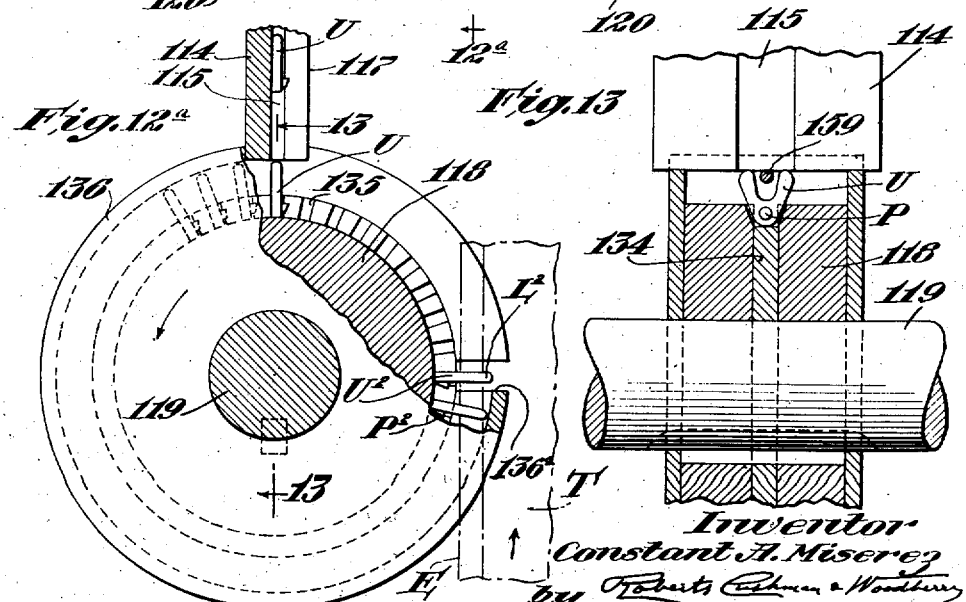

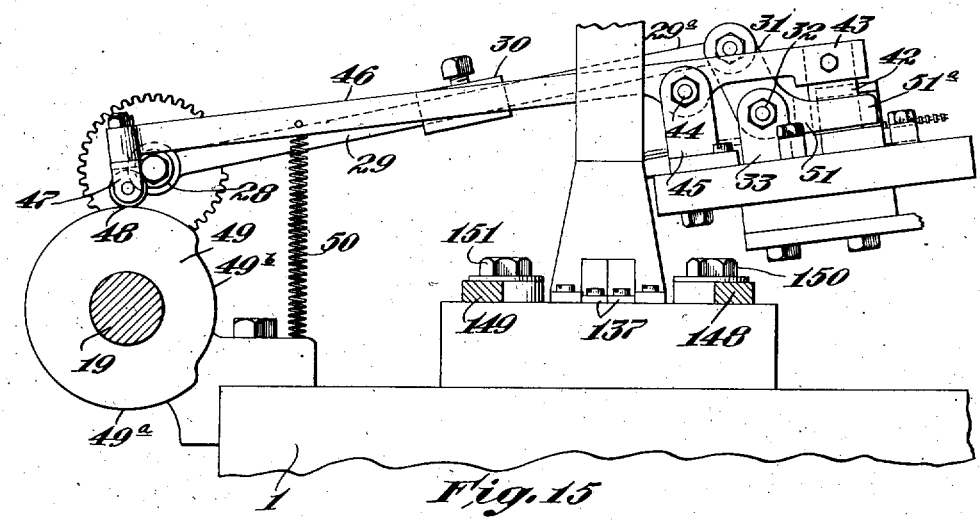

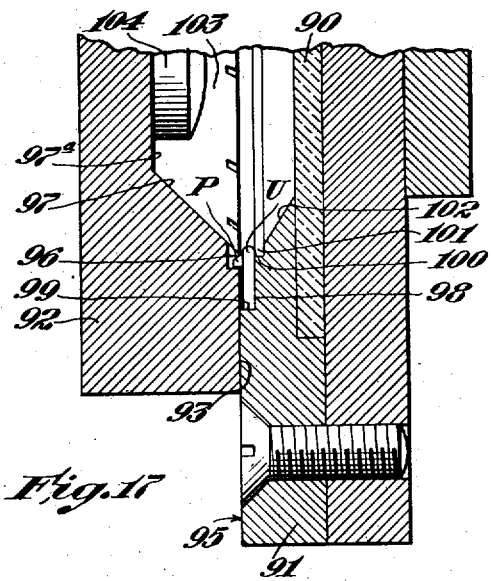
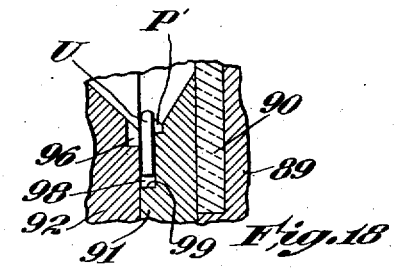
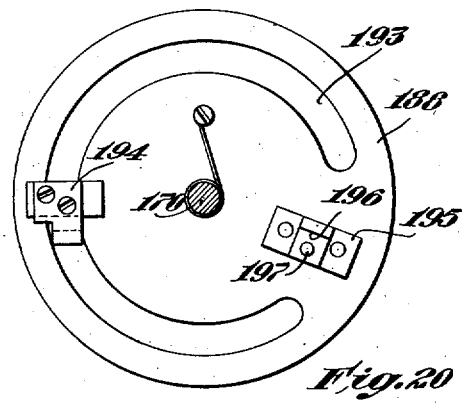
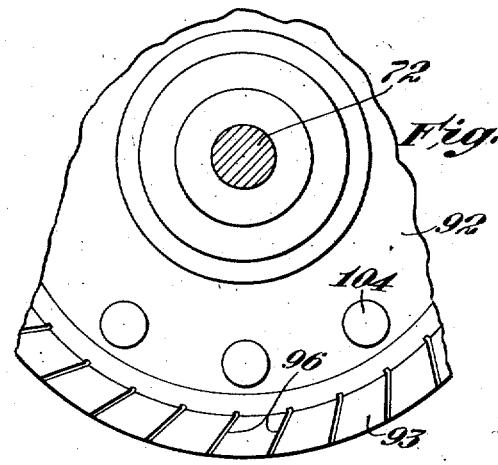
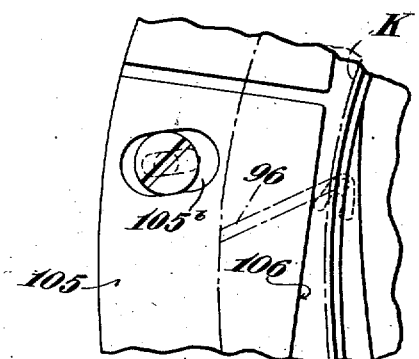
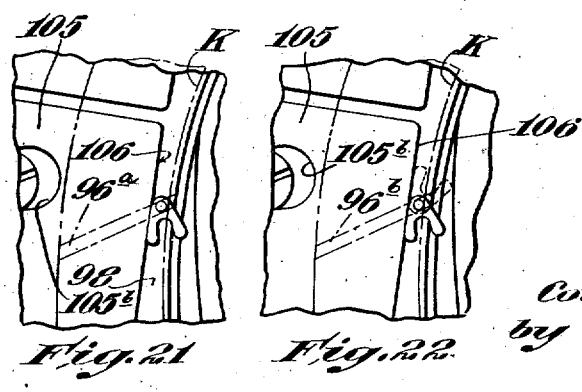

Patented May 18, 1937

2,080,984

UNITED STATES PATENT OFFICE 2,080,984

APPARATUS FOR ATTACHING FASTENERS

Constant A. Miserez, Montreal, Quebec, Canada, assignor to G. E. Prentice Manufacturing Company, Berlin, Conn., a corporation of Connecticut Application January 21, 1935, Serial No. 2,742

31 Claims. (Cl. 153—1)

This invention pertains to apparatus for attaching small independent members (for example fastener elements or units such as are comprised in a slide-actuated fastener) to a support, for instance, the flexible stringer tape of such a fastener. However, while particularly designed for attaching such fastener elements or units as just referred to, the apparatus herein described is contemplated to be of wider application and utility.

Heretofore, in the manufacture of slide-actuated fasteners, sometimes referred to as "zippers", it has been common to form the fastener elements or units successively from appropriate sheet material or wire and to attach them directly to the tape or stringer one after another as formed. While this mode of procedure is simple and rapid, it affords no opportunity for smoothing the fastener elements or units, or for removing burrs resulting from the cutting operation and which are particularly noticeable when the cutting dies become dull. In consequence the completed fastener may not have as finished an appearance as desired and may not always operate as smoothly as is demanded by the trade.

In order that the fastener elements or units may have a smooth surface finish, such for example as may be produced by tumbling them and/or plating them, I propose to prepare the fastener units in quantity, imparting thereto any desired finish, and thereafter, as a separate operation, to apply such finished units in series to the edge of the stringer tape.

The principal object of the present invention is to provide an improved method of separating the fastener units or elements from a mass of such units (which have preferably undergone a finishing operation), bringing the separated units one after another into proper associative relation with the stringer tape, and anchoring them to the latter so as to form a series of desired length, and to provide apparatus of a simple type operative to carry out such method with the requisite accuracy and at high speed.

While in its broader aspects the invention may be applicable to the attachment, to an appropriate support, of any type of independent elements to form a series, the invention is herein described for specific illustration and convenient reference as embodied in the manufacture of fastener units of the type in which such units are attached to the edge of a flexible stringer tape, and more particularly to the application of units of the general type illustrated, for example, in the patent to Prentice No. 1,658,392, dated February 7, 1928. The units or fastener elements disclosed in said patent are of "block" type, each comprises a substantially flat solid body portion having spaced divergent attaching jaws at one end, and (adjacent to its other end) an interlocking projection on one face and a complemental recess in its opposite face. Such fastener units must be firmly anchored to one edge of the tape by compressing the attaching jaws of the unit so as to embrace the edge (usually beaded) of the tape between them, the several units being spaced from one another a distance closely approximating the thickness of one of the units and each series of units being of the desired length for making a fastener.

For effective commercial production, it is desirable, after applying units to form a series of desired length, to leave a length of the stringer tape devoid of units before commencing another series, and a subsidiary object of the present invention is to provide mechanism readily capable of intermitting the attachment of units to the tape at predetermined times and for predetermined, preferably variable, periods, and likewise to provide for variation within a wide range in the length of the series of fastener units.

A further object is to provide a mechanism, of simple and reliable character capable of selecting fastener elements from an indiscriminate mass thereof and delivering the selected elements in succession and in accurately predetermined and properly spaced relation for application to the edge of the stringer. A further object is to provide fastener-applying means of simple and durable type having few operative parts and in which the moving members which actually engage the fastener elements move through paths of very small extent.

Other objects and advantages of the invention will be made manifest in the further and more detailed description and by reference to the accompanying drawings wherein I have illustrated one desirable embodiment of mechanism useful in the practice of my improved method.

In the drawings,—

Fig. 1 is a front elevation of my improved fastener mechanism;

Fig. 2 is a plan view, partly in horizontal section, showing parts illustrated in Fig. 1;

Fig. 3 is a front elevation, to larger scale, of the rear member of the unit selecting mechanism, the picker disk being mostly broken away;

Fig. 4 is a section substantially on the line 4—4 of Fig. 3, but with the picker disk is assembled relation to the other parts;

Fig. 5 is a fragmentary horizontal section, to larger scale, on the line 5—5 of Fig. 1;

Fig. 6 is a fragmentary vertical section, to larger scale, on the line 6—6 of Fig. 2;

Fig. 7 is a vertical section substantially on the line 7—7 of Fig. 6, but to smaller scale, showing the timer cam disk;

Fig. 7a is a view similar to Fig. 7, but showing the parts in another position;

Fig. 8 is a fragmentary rear elevation, to larger scale, illustrating the driver pawl for the timer cam disk;

Fig. 9 is a fragmentary vertical section, to larger scale, substantially in the plane of the line 9—9 of Fig. 2;

Fig. 10 is a fragmentary vertical section, to larger scale, on the plane of the line 10—10 of Fig. 2;

Fig. 10a is a substantially horizontal section on the line 10a—10a of Fig. 10;

Fig. 11 is a fragmentary plan view, partly in horizontal section, substantially on the line 11—11 of Fig. 10;

Fig. 12 is a fragmentary front elevation of the parts shown in Fig. 11;

Fig. 12a is a fragmentary vertical section, to larger scale, on the line 12a—12a of Fig. 12;

Fig. 13 is a fragmentary vertical section substantially on the line 13—13 of Fig. 12a;

Fig. 14 is a fragmentary vertical section substantially on the line 14—14 of Fig. 2;

Fig. 15 is a fragmentary vertical section substantially in the plane of the line 15—15 of Fig. 2;

Fig. 16 is an elevation, partly in vertical section substantially on the line 16—16 of Fig. 4;

Fig. 17 is a fragmentary vertical section substantially in the same plane as Fig. 4, but to larger scale, showing the lower part of the selecting mechanism with a unit properly positioned therein;

Fig. 18 is a fragmentary view similar to Fig. 17, but showing the unit so positioned that it will not be delivered to the delivery chute;

Fig. 19 is a fragmentary rear elevation of the lower part of the picker disk;

Fig. 20 is a vertical section substantially on the plane of the line 20—20 of Fig. 2;

Fig. 21 is a fragmentary elevation, to larger scale, showing a part of the mechanism at the left-hand side of Fig. 4, and indicating a fastener unit properly positioned to enter the path leading to the delivery chute;

Fig. 22 is a view similar to Fig. 21, but showing how a fastener unit, moving with its jaws uppermost, will, at this point in its path, be automatically reversed; and Fig. 23 is a view similar to Fig. 21, but showing how a unit, having its pin projecting rearwardly, will be discharged before entering the path leading to the chute.

Referring to the drawings, the numeral 1 designates a supporting table carried by legs 2 which may rest upon and be secured in any desired manner to an appropriate support 3, for example, the top of a bench. The table 1 is provided at its rear edge with a pair of rearwardly projecting bearing brackets 4, 4a (Fig. 2) providing aligned journal openings for a main drive shaft 5. Near one end (Fig. 2) this shaft has fixed thereto a clutch member 6 adapted at times to engage a complemental clutch element 7 secured to the hub of the drive pulley 8 which is mounted so as normally to turn freely on the shaft 5. A clutch controlling slide 9 is mounted in a suitable guideway in a block 10 carried by the table 1, and this slide is urged toward clutch disengaging position by a spring 11. The forward end of the slide 9 is provided with a handle 12 by means of which the slide may be moved forwardly. Near its forward end the slide is furnished with a shoulder adapted at times to cooperate with a retaining latch 13 pivotally secured at 14 (Fig. 1) to the block 10 and counterweighted at its right-hand end 15 so that it normally tends to remain in latching position. The left-hand end of the latch lever 13 may be furnished with an opening for the attachment of a chain 16 or other connection leading to a treadle or equivalent device (not shown) whereby the latch may readily be disengaged from the slide 9, thereby to stop the machine.

Adjacent to its opposite end (Fig. 2) the shaft 5 has fixed thereto a bevel gear 17 which meshes with a bevel gear 18 of the same diameter mounted on a shaft 19 (Figs. 1 and 2) turning in brackets 20 and 21 secured to the right-hand part of the table 1. The bracket 21 is furnished with an upstanding portion 22 (Fig. 1) carrying a bearing sleeve 23 in which a short shaft 24 (Fig. 5) is journaled to turn.

At its left-hand end, as viewed in Figs. 2 and 5, the shaft 24 projects beyond the bearing sleeve 23 and is provided with a gear 25 keyed or otherwise fixed to the shaft and which meshes with a gear 26 (Fig. 2) fast to the shaft 19, the gears 25 and 26 being of the same diameter. Beyond the gear 25 the shaft 24 is furnished with an eccentric 27 having an eccentric strap 28 which is secured to the end of a rod comprising parts 29 and 29a (Figs. 1 and 15) adjustably united by a turnbuckle device 30. This eccentric 27 with its rod 29, 29a constitutes the actuating means for the tape feed mechanism. The left-hand end of the rod member 29a, as viewed in Fig. 1, is pivotally united to the upstanding arm 31 of a bell-crank lever which is pivotally secured at 32 to a bracket 33 (Figs. 1 and 15) projecting upwardly from a slide 34 (Figs. 2 and 14) moving in a guideway in a block 35 (Fig. 1) carried by a bracket 36 (Figs. 1 and 2) secured to the table 1.

As shown in Fig. 1, the block 35, with its slide, is inclined downwardly and to the right. The slide 34 is held in position within the slot in the block 35 by means of a pair of bridge members 37 and 38 (Fig. 2) extending across the top of the slide and attached to the block 35. A spring 39 (Fig. 2), secured to the bridge member 38, frictionally bears on the upper surface of the slide 34 and constitutes a brake to prevent overtravel of the slide.

The upper surface of the slide 34 is furnished with a longitudinally extending groove 40 (Fig. 14) which is adapted to receive the beaded edge of the stringer tape T after the fastener units have been applied to such edge. The upper surface of the slide 34 constitutes a rest for the body portion of the tape. In this surface is formed a longitudinal slot which receives a fixed work-supporting member 41 (Figs. 2 and 14) which is suspended from the bridge pieces 37 and 38. This work-supporting member 41 cooperates with a vertically moving hold-down blade 42 (Figs. 14 and 15) which is carried by the arm 43 of a lever pivoted at 44 (Figs. 1 and 15) to a bracket 45 secured to the block 35. This lever has a second arm 46 which extends toward the right-hand side of the machine, as viewed in Fig. 1, and which is furnished near its free extremity (Fig. 15) with a downwardly directed vertically adjustable bracket 47 carrying a cam follower roll 48 which rests upon the peripheral surface of a cam 49 (Figs. 2 and 15) fixed to the shaft 19. This cam is furnished with a pair of concentric dwell portions 49a and 49b, respectively, the latter being of less radius and circumferential extent than the dwell portion 49a. A spring 50, acting on the arm 46, holds the cam follower roll 48 against the periphery of the cam 49.

The bell crank lever 31 (Figs. 1 and 15) has an arm 51 which is bifurcated to provide the presser feet 52, 52a (Fig. 14) disposed at opposite sides of the hold-down blade 42, and which are adapted to press the body portion of the tape firmly against the slide 34 so that the tape will move with the latter. Since the bell crank lever is pivoted at 32 to the bracket 33 carried by the slide 34, it will be evident that as the rod member 29a is moved to the left (Fig. 1), it will first swing the bell crank 31 about its pivot 32 thereby to cause the presser feet 52 and 52a to engage the tape, and thereafter, as the rod 29a continues to move to the left, the entire slide 34 will be carried to the left, thus feeding the tape positively in the direction of movement of the slide.

The cam 49 (Fig. 15) and the eccentric 27 (Fig. 5) are so related that as the slide 34 moves to the left (Fig. 1), the hold-down blade 42 is raised, but at the end of the movement of the slide to the left, the hold-down blade 42 is quickly moved downwardly, thereby pressing the tape firmly against the fixed support 41 (Fig. 14) and holding the work stationary so that it will not be retracted when the presser feet 52 and 52a are raised and the slide 34 is moved toward the right. A suitable guard member 53 secured to the slide 34 is arranged to overhang the presser foot 52a and thereby to prevent excess upward movement of the latter.

The tape T preferably is carried on a supply spool 54 (Fig. 1) suitably journaled at a point below the bench 3, and from this spool the tape passes up through an opening in the bench 3 and preferably between a pair of spring-pressed tension rods 55 and 56. After passing between these rods, the tape passes through a vertical slot in a tape positioning member 57 (Figs. 10 and 10a) disposed in a vertical slot in the table 1 and carried by a slide 58 arranged to move in guideways at the under side of the table. This slide is normally urged rearwardly by a spring 59. The engagement of the tape T by the part 57 causes the tape to be urged resiliently rearwardly in its own plane. The guide 57 extends almost up to the unit applying position, and from the latter point the tape extends upwardly to a curved guide 60 (Figs. 1 and 2) which is secured to the right-hand end of the block 35, as viewed in Fig. 1, and which has a smoothly curved upper surface arranged to guide the tape onto the upper work-supporting surface of the slide 34.

After leaving the slide 34 the tape passes upwardly in an inclined direction, as viewed in Fig. 1, beneath a freely rotatable guide roll 61 mounted on a suitable support, and to a spool 62 mounted on a shaft 63 arranged to turn freely in bearings at the upper part of a bracket structure 64 (Fig. 1) suitably secured to the bench 3. The spool 62 preferably is removably united to the shaft 63 by means of a set screw 62a so that the filled spool may readily be removed and replaced by an empty spool. The shaft 63 is furnished with a pulley 65 which receives a belt 66 passing over a guide pulley 67 mounted on the bracket structure 64 and thence down and around a pulley 68 (Figs. 1 and 2) fixed to the left-hand end of the shaft 5, as viewed in Fig. 1. The spool 62 is thus slowly rotated in time with the operation of the machine, but by the use of the belt drive the spool with its shaft is permitted to slip, if necessary, to avoid placing undue tension on the tape as the latter is delivered from the machine.

A post or column 69 (Figs. 1, 2, 3 and 4) extends upwardly from the table 1 and supports the fastener unit supply mechanism. This mechanism is carried by a bracket 70 (Fig. 4) constituting a support for a forwardly extending fixed sleeve member 71. This sleeve member is provided with an elongate bearing for a shaft 72 provided at its rear end with a pulley 73 (Fig. 1) about which passes a belt 74 which, at its lower part, extends around a small pulley 75 turning on a stub shaft 76 carried by a bracket secured to the post 69. A larger pulley 77 is fixed to the pulley 75 and is embraced by a belt 78 which extends downwardly and around a pulley 79 (Fig. 2) secured to the shaft 5,—a suitable guide pulley 80 (Fig. 1) carried by a bracket mounted on the post 69 guiding the belt 78 in the proper direction. The provision of a belt drive between the shaft 5 and the shaft 72 permits relative slippage between the drive shaft 5 and the driven shaft 72 so that the shaft 72 may readily stop if its free turning is interfered with.

A collar 81 (Fig. 4) is fixedly secured to the sleeve 71, and this collar is integral with container 82 having a conical interior cavity 83 for the reception of fastener units. A bracket 84 is secured to the member 70 and supports a supply receptacle 85 (Figs. 1, 4 and 16) for fastener units, such receptacle having a slightly inclined floor 85a having an aperture at its lower end opening into a conduit 86 (Fig. 16) leading to an opening 87 (Fig. 3) in the wall of the receptacle 82 near the lower part of the latter. The receptacle 85 is adapted to hold the bulk of the fastener units, a relatively small number of which gradually pass down through the conduit 86 into the container 82. It has been found in the operation of machines employing automatic feed mechanism for small metallic parts that if a large body of such parts be constantly agitated in a hopper they tend to cling together, possibly due to some electromagnetic action. For this reason, in the present mechanism, it is preferred to avoid agitation of a large number of the fastener units and to deliver the units gradually and in small numbers into the chamber 83 from which they are selected one by one by the picker mechanism.

The container 82 is provided at its forward end with a radial flange 88 to which is secured an annulus 89 against which an annular glass plate 90 is clamped by means of an annulus 91. A picker disk 92 is arranged in front of the member 91, this picker disk being provided with a substantially flat rear face 93 (Figs. 4 and 16) having sliding contact with the forward face 95 of the annulus 91. The picker disk 92 is furnished with a series of inclined slots 96 (Figs. 3, 17, 18, 19) in its rear face, these slots being of a width and depth such as to accommodate the projecting pin member P of a fastener unit U.

Radially inward of the face 93, the picker disk is furnished with an annular beveled surface 97 (Fig. 17) which extends to a surface 97a parallel to but forward of the surface 93. The annulus 91 is provided with an annular recess 98 (Fig. 18) at its inner edge, this recess having an outer wall 99 and extending inwardly to an annular surface 100 (Fig. 17) defining a second annular recess 101 from the upper part of which a beveled annular face 102 extends to the plane of the glass plate 90. The space between the front surface of the glass plate and the surface 97a of the picker disk constitutes a chamber 103 into which fastener units gradually drop from the chamber 83. Preferably the surface 97a is provided with a series of studs 104 reaching into the chamber 103 and adapted to agitate fastener units which are delivered into such chamber.

The annulus 91 is cut away at its left-hand portion, as viewed in Fig. 3, to provide a recess for the reception of a knock-off plate 105, pivotally secured at 105a and having a slot 105b at its upper end, thereby permitting the knock-off plate to be adjusted toward and from the axis of shaft 72. The knock-off plate 105 is provided with a substantially straight, inclined cam surface 106 which is very nearly tangential to the circle described by the inner ends of the slots 96 in the rear face of the picker disk 92,—the circle K described by the inner ends of such slots being located slightly inward of the edge 106 of the plate 105 (Figs. 21, 22, 23).

It will further be noted that the edge 106 overlaps the recess 98, extending toward the inner boundary of the latter, the distance between the innermost point of cam surface 106 and such inner boundary being slightly greater than the diameter of the projecting pin P of a fastener unit U. Assuming, for example, that a unit drops down into the position shown in Fig. 17 so that its diverging legs are disposed in the recess 98 and its forwardly projecting pin P is caught by the inner end of one of the slots 96,—the rotation of the picker disk in a clockwise direction, as viewed in Fig. 3, will carry the unit upwardly toward the left until the unit engages the cam surface 106. If by any chance the unit is not hanging directly down (being suspended by its head in the slot 96a), contact of the leg of the unit with the inclined surface 106 (Fig. 21) will tend to orient the unit so that it will hang directly downward. If, for example, the unit should be turned so that its legs are directed upwardly, as viewed in Fig. 22, engagement of one of its divergent legs with the surface 106 will cause the unit to swing and overbalance, pivoting about its pin P in the slot 96b, and thus the unit will swing by gravity until it depends substantially downwardly.

If by chance a unit should enter the recess 98 with its pin P' disposed rearwardly (Fig. 18) so that it does not enter one of the slots 96, and if the frictional engagement of the picker disk with such unit should carry the latter upwardly to the region of the knock-off plate 105, such unit (Fig. 23), as it reaches the point at which the cam surface 106 overlaps the recess 98, will be pushed out of the recess 98 by the action of the surface 106, since the unit is not supported by engagement of its pin P in one of the slots 96 of the picker disk. Such unit therefore will drop freely down into the lower part of the chamber 103, and may eventually be turned around so that its head will project forwardly in proper position to engage one of the slots 96 in the picker disk.

After the units have been properly oriented by the action of the cam surface 106, or have been knocked off if improperly positioned, those whose pins still engage the slots 96 are carried upwardly by the movement of the picker disk to the region of a plate 107, also secured in a recess in the surface 95 of the clamping plate 91. This plate 107 is provided with convergent cam surfaces 108 and 109, respectively, the surface 108 acting as a further safeguard to divert any improperly positioned units (carried upwardly by friction) downwardly into the chamber 103. Units which are properly positioned with their pins projecting forwardly and engaging one of the slots 96 will be carried by the latter into the channel 111 defined by the edge 109 of the plate 107 and by a cam surface 110 in the annulus 95. The channel 111 leads to a concentric recess or path 112 formed in the front face of the annulus 95, but having a greater radius than the channel or recess 98. This channel 112 is of just sufficient radial width to accommodate the body portion of a fastener unit properly positioned and with its pin projecting forwardly into one of the recesses 96 of the picker disk. As the latter revolves it carries such units along the channel 112 until, at the right-hand part of the selector device, such units with their pin ends or heads directed downwardly are delivered into the upper end 113 (Fig. 3) of a chute which extends downwardly to the unit-presenting mechanism.

This chute preferably comprises a vertically arranged rear member 114 (Figs. 11, 12, 12a, 13) having a vertical slot 115 in its front face of such width as to accommodate the divergent leg portions of a fastener unit when the head or pin end of such unit is directed downwardly,—the chute also comprising a pair of plates 116 and 117, respectively, which overlap the edges of the slot 115 and serve to confine the unit in the slot, the adjacent edges of the plates 116 and 117 being spaced apart a distance slightly greater than the diameter of the pin P of one of the units. The upper end of this chute is secured to the member 89 of the unit selecting device, and its lower end is bolted to the upper surface of the table 1.

Immediately beneath the lower end of the slot 115 which constitutes the guideway for the fastener units on their way from the selecting mechanism to the presenting mechanism, there is arranged an endless continually moving presenting member which, as here illustrated, comprises a disk 118 (Figs. 12, 12a, 13) keyed to a shaft 119. This shaft 119 (Figs. 9, 12, 13) is mounted to turn in bearings in blocks 120 (Fig. 12) mounted on the table 1, and is turned step-by-step by means of a ratchet wheel 121 (Fig. 9) secured to the shaft 119 and which is actuated by a pawl 122. This pawl 122 is pivotally secured to a rock-arm 123 (Fig. 2) mounted on a shaft 124 in alignment with the shaft 119 and turning in a bearing block 125 mounted on the table 1. A spring 126 (Fig. 9) tends to hold the pawl 122 in engagement with the teeth of ratchet 121, and the rock arm 123 is urged rearwardly by means of a tension spring 127 (Fig. 2). A locking pawl 128 (Fig. 9) is pivoted to a block 129 mounted on the table 1 and is urged into contact with the teeth of ratchet 121 by a spring 130.

At its right-hand end the shaft 124 is furnished with a second rock arm 131 (Fig. 2) carrying a cam follower roll 132 which engages the face of a cam 133 secured to the shaft 19, the arrangement being such that, for each rotation of the shaft 19, the ratchet 121 is pawled forward one tooth. The rotary, presenting disk 118 is furnished with a peripheral groove 134 (Fig. 13) in a vertical plane directly below the lower end of the guideway 115 down which the fastener units drop from the selecting mechanism.

This groove 134 is furnished with a series of pairs of pockets or recesses 135 (Figs. 12, 12a) in its opposite walls, such recesses, with the inner portion of the groove itself, defining sockets for the reception of individual units. These sockets are spaced peripherally by angular amounts corresponding to the angular distances through which the shaft 119 is turned at each actuation of the pawl 122, and are so arranged that, at the end of each stroke of the pawl 122, one of these sockets is disposed directly below the slot 115 in position to receive a fastener unit which drops from such slot. The smooth peripheral surface of the disk 118, intermediate successive sockets, constitutes a support or stop for any unit which may drop downwardly from the slot 115 while the disk is turning and holds the unit with its leg portion in the lower part of the slot 115 until one of the sockets is brought around in position to receive such unit. It is thus impossible for more than one unit at a time to be delivered from the lower end of the chute.

The presenting disk 118 is turned in a counter-clockwise direction, as viewed in Fig. 12a. Guard members 136 having portions 137 (Fig. 2) by means of which they are secured to the table 1, extend around the periphery of the presenting disk from a point just to the rear of the lower end of the chute to the point 136ª (Fig. 12a) immediately below the position at which the units are secured to the stringer tape T. These guard members 136 prevent units, which have once been deposited in the sockets in the presenting disk, from escaping or becoming displaced until they have reached the substantially horizontal position indicated at U² (Fig. 12ª) with their divergent legs L² disposed at opposite sides of the beaded edge E of the stringer tape T, which at this position is moving vertically upward.

It will be noted that as the units move around in a circular path in the sockets in the presenting disk, the path traversed by the inner point of the recess or notch, between the divergent legs of the unit, gradually converges toward the edge E of the tape until, in the presenting position, where the units are substantially horizontal, the edge E of the tape is disposed snugly within the recess between the legs of the unit. The tape positioning device 57 above described, which is urged toward the periphery of the presenting disk by the spring 59, forces the edge E of the tape very firmly into the recess between the legs of the unit so as to ensure proper relative position of the units and the tape preparatory to uniting the units to the tape.

Two die members 138 and 139 (Figs. 11 and 12), respectively, disposed at opposite sides of the tape at the unit attaching point, are carried by slides 140 and 141, respectively, arranged to slide horizontally in guideways in the blocks 120,—the dies preferably being adjustably and removably secured to the slides 140 and 141. These slides are provided with upstanding pins 142 and 143, respectively, which enter slide blocks 144 and 145, respectively, in slots 146 and 147 in the forward ends of die-actuating levers 148 and 149, respectively. These levers are pivoted on vertical studs 150 and 151 (Figs. 2 and 11) carried by the blocks 120, and the rear ends of levers 152 and 153 are furnished with cam follower rolls 154, 155, respectively, which engage the faces of cams 156 and 157 secured to the drive shaft 5.

A tension spring 158 (Fig. 2) tends to draw the rear ends of the levers 148 and 149 toward each other, thereby to retract the dies from the work. The cams 156 and 157 are furnished with active portions so arranged as at the proper time to move the rear ends 152 and 153 of the die-actuating levers apart and thereby to force the dies 138 and 139 toward each other and into engagement with the opposite divergent legs L² (Fig. 12ª) of the unit U² disposed in the attaching position. The active parts of the cams 156 and 157 are of small peripheral extent so that the dies, after actuation, are quickly released from the work, permitting the tape with the attached unit to be moved upwardly the proper distance to receive the next unit as the latter is brought up into attaching position.

The presenting disk 118 is continually driven (while the machine is in operation) step-by-step by the pawl 122, while the tape is likewise continually actuated step-by-step by the operation of the presser feet 52, 52ª as above described. Since it is desired in the manufacture of fasteners of the type in question to leave spaces between successive series of units attached to the edge of the stringer, it is necessary to intermit the delivery of units to the presenting disk 118 for predetermined periods. For this purpose a gate member is provided,—preferably in the form of a pin 159 (Figs. 2 and 10) adapted to enter the slot between the members 116 and 117 at a point near the lower end of the guide channel 115, and so as when positioned within such channel to prevent fastener units from dropping into the sockets of the rotary presenting disk. This pin 159 is conveniently carried by a downwardly depending pivoted arm 160 (Fig. 10) pivotally supported at 161 and normally pressed rearwardly by a spring 162. The rear surface of the arm 160 is formed as a cam 163 which may at times be engaged by pin 164 (Figs. 2 and 10) projecting radially from a shaft 165 mounted to rock in a bearing sleeve 166 (Fig. 2) carried by the table 1. At its forward end the shaft 165 is provided with a rock arm 167 furnished with a cam-follower roll 168 (Figs. 2, 7, 7ª) which is disposed in the vertical plane of a timer disk 169.

The timer disk 169 is mounted to turn freely on the hub 170 of a ratchet disk 171 (Figs. 2, 6, 8) which turns freely on a fixed shaft 172 secured at its rear end in a boss 173 (Fig. 2) projecting from the table 1, and at its forward end in a bracket 174 rigidly secured to a post 174ª projecting forwardly from the table 1. The cam disk 169 is held in position on the hub 170 by means of a plate 173ᵇ (Fig. 6) secured to the hub by screws 174ᵇ. The disk 171 is provided with peripheral ratchet teeth 171ª (Fig. 8) with which a pawl 175 engages. This pawl is mounted on the free end of a rod 176 which is provided at its other end with an eccentric strap 177 (Fig. 5) which embraces an eccentric 178 on the forward end of the shaft 24. Preferably, the pawl 175 is pivoted to rod 176, and the weight of the rod and a spring (not shown) attached to the side of the pawl retain the latter in driving contact with the fine teeth 171ª of the ratchet disk 171. The eccentricity of the eccentric 178 is such that as the shaft 24 rotates, the pawl 175 will move the ratchet disk 171 forwardly through an angular distance corresponding to the length of one of the teeth 171ª.

The forward face of the ratchet disk 171 is furnished with teeth 179 (Fig. 6), (preferably of substantially square cross section) which are normally engaged by a clutch tooth 180 at the rear end of a sliding rod 181 mounted in a sleeve 182 fixed in an opening in the cam disk 169. A spring 183 tends to force the rod 181 rearwardly so as to project the tooth 180 into the space between adjacent teeth 179 of the ratchet disk, thereby to lock the cam disk 169 to the ratchet disk. A pin 184, fixed to the rod 181, limits the rearward movement of the latter. The sleeve 182 has a recess 185 at one side, and the pin 181 has an inclined cam surface 186 exposed within this recess. At times, this cam surface is engaged by a normally fixed, beveled, retractor blade 187 (Figs. 2 and 6) which, by cooperation with the beveled cam surface 186, retracts the pin 181, thereby releasing the tooth 180 from between the teeth 179 and thus freeing the cam disk 169 from the ratchet disk 171.

The bracket 174 supports a fixed substantially circular plate 188 (Figs. 1, 2, 6, 20) concentric with the shaft 172, and between this plate and the cam disk 169 a spring 189 is coiled about a sleeve 190 (Fig. 7) which telescopes over the forward reduced end of the shaft 172. One end of this spring is secured to a screw or stud 191 projecting from the rear side of the plate 188, and the other end of the spring is secured to a selected one of a series of studs or screws 192 projecting forwardly from the cam disk 169. By engaging the inner end of the spring 189 with one or another of the screws 192, the tension of the spring may be varied,—the arrangement of the spring being such that it tends to turn the cam disk 169 in a clockwise direction, as viewed in Figs. 1 and 7.

The plate 188 is furnished with a concentric slot 193 adapted adjustably to receive a block 194 (Figs. 2 and 20) which supports the retractor blade 187. This block is held in adjusted position in the slot by means of a bolt 194ª (Fig. 1) and preferably is provided with a pointer or index 194ᵇ adapted to cooperate with a series of graduations on the front surface of the plate 188. These graduations may be indexed to show the length of the series of fastener units applied by the machine to the stringer tape. Thus, for example, merely by placing the pointer 194ᵇ at a given index character on the front of the plate 188, the machine is set so as automatically to set units on a corresponding length of tape, and then to cease affixing units for a predetermined interval.

At a suitable point, preferably between the adjacent ends of the curved slot 193, a block 195 (Fig. 2) is secured to the rear side of the plate 188, such block having a fixed stop shoulder 196 (Fig. 20) adapted at times to contact with the forwardly projecting end of the sleeve 182 (or with a separate stop element carried by the cam disk 169 if preferred). Preferably, in order to provide a dead stop, that is to say, to avoid rebound of the cam plate 169 when the latter is reversed as hereinafter described, a spring-pressed friction pin 197 (Fig. 20), is arranged within the block 195 so as frictionally to engage the sleeve 182 as the latter comes into contact with the stop 196, thus avoiding rebound, although permitting ready separation of the parts upon the application of driving force.

The periphery of the cam disk 169 is furnished with one or more cams 198 (Figs. 7, 7a) secured to the disk in any desired manner,—the cam 198 being of such radial height as, when in engagement with the cam follower roll 168, to raise the latter and thereby swing the rock shaft 165 in a counterclockwise direction so as to cause the pin 164 to move downwardly, thereby permitting the spring 162 (Fig. 10) to move the gate 159 inwardly into the groove or channel 115, thereby to stop downward flow of fastener units. The cam 198 is of such length circumferentially as to keep the gate 159 in its active or closing position for such a length of time as corresponds to the desired interval between successive series of fastener units on the tape. In other words, while the cam follower roll 168 rests upon the periphery of the cam 198, the tape will be fed forward without receiving fastener units so as to leave a blank space of the desired length. By varying the peripheral length of the cam 198, as, for example, by substituting one such cam for another of a different length, the interval between successive series of fastener units may be varied.

Operation

In the operation of the machine, the receptacle 85 is first furnished with a supply of fastener units which may conveniently be stamped out from sheet metal in the usual way and may then be smoothed, polished and/or plated if desired before being placed in the receptacle. The tape T is supplied from the spool 54, or from any other suitable source, and is threaded up between the tension members 55 and 56, thence upwardly through the guide and tensioning member 57, thence up past the unit-applying position and over the guide 60, thence over the upper surfaces of the slide 34 and the work-supporting member 41 and beneath the presser feet 52 and 52ª and the hold-down blade 42, thence beneath the guide roll 61 and to the barrel of the spool 62, the latter being secured to the shaft 63 by the thumb screw 62ª.

It being assumed that the pulley 8 is driven from some suitable source of power, the operator pulls the slide 9 forwardly by means of the handle 12 and allows the latch 13 to engage the slide, thereby to hold the clutch parts 6 and 7 in driving engagement. The shaft 5 is now driven continuously and through the various connections described actuates the operative elements of the machine. As the machine first starts in operation, the vibration of the parts causes the units gradually to drop down through the chute 86 into the chamber 83 of the unit supply mechanism and some of these units drop down into the recess 98. The picker disk 92 is slowly revolved, and any such units as drop into the recess 98 so that their pins P are directed forwardly may be caught by the grooves 96 in the picker plate 92 and carried by the latter in a clockwise direction, as viewed in Fig. 3, upwardly until they eventually reach the groove 112.

As above described, such units as may be carried upwardly by frictional contact with the disk 92, but which are not properly positioned to enter the path 112 will be pushed off or will drop off in passing the cam surface 106. The properly positioned units pass along the path 112 with their pin or head ends in advance and eventually, as above described, drop down into the slot 115 in the delivery chute.

When a unit reaches the bottom of this chute, it drops head down into one of the sockets in the rotary presenting wheel 118 with the legs of the unit diverging upwardly. The wheel 118 rotates in a counterclockwise direction, as viewed in Figs. 10 and 12a, and eventually brings the units around to the horizontal position, as indicated at U² (Fig. 12a). During this time the tape has been advanced continually step-by-step by the alternate action of the presser feet 52 and 52ª and the hold-down blade 42, and as the units move around with the presenting wheel 118, they gradually approach the beaded edge E of the tape as the latter moves vertically up past the unit attaching position.

The forward movement of the tape is timed with that of the presenting wheel so that the tape comes to rest momentarily just as a unit reaches the position U² (Fig. 12) and likewise momentarily comes to rest in this position. During this period of rest the cams 156 and 157 operate the die levers to press the die members 138 and 139 from opposite directions into engagement with the opposite divergent legs of the fastener unit U², thus pressing the legs into firm contact with the opposite faces of the tape, thereby securely anchoring the unit to the tape. The die members immediately retract and the tape is again advanced upwardly one step, at the same time that the presenting wheel 118 makes another forward step, thereby to bring another fastener unit into the attaching position. As above described, the beaded edge of the tape is firmly forced into the recess between the legs of the unit by the action of the tape guide 57 so that when a unit is attached to the tape, the edge of the latter will be gripped very firmly between the legs of the unit.

In describing the above operation, it has been assumed that the gate member 159 has previously been retracted from the vertical recess 115 in the delivery chute so that fastener units are free to drop down into the sockets in a presenting wheel. This condition exists while the cam follower roll 168 is in contact with the periphery of the cam disk 169. During the period of operation, as above described, the pawl 175 is moving the ratchet wheel 171 forward one tooth for each revolution of the shaft 24, that is to say, for each forward step of the tape and of the presenting wheel 118. This forward motion of the ratchet wheel carries with it the cam disk 169 by reason of the normal position of the tooth 180 between adjacent teeth 179 of the ratchet disk, and during this motion the spring 189 is placed under added tension.

When the cam disk has turned through a predetermined arc, in accordance with the selected position of the block 194 in the slot 193, the cam surface 186 of the pin 181 comes into contact with the fixed retractor blade 187. The pin 181 is thereby retracted, pulling the tooth 180 out from between the teeth 179, whereupon the spring 189 immediately snaps the cam disk 169 backwardly, that is to say, in a clockwise direction, as viewed in Fig. 7, until the cam 198 is brought beneath the cam follower roll 168. This immediately rocks the shaft 165 and allows the gate 159 to close the vertical recess 115 in the delivery chute, thus cutting off further delivery of units to the presenting wheel. However, this wheel has already been provided with units extending throughout substantially three-quarters of a circumference, and as this wheel continues to rotate, this group of units continues to be fed to the tape until all of the units in the presenting wheel have been used up. Thereupon the wheel turns through a certain angular distance without presenting units to the tape and accordingly a blank space is left between the series of units previously fixed to the tape and the next series. This blank space corresponds to the length of the cam 198.

It will be noted that the pawl 175 which operates the ratchet disk 171 operates continually and the ratchet wheel 171 moves forwardly step-by-step without interruption. Thus as soon as the cam disk 169 has been restored to starting position, in which the cam 198 is disposed beneath the cam follower roll 168, the cam disk immediately resumes its normal turning forward movement in a counterclockwise direction, the tooth 180 snapping between two adjacent teeth 179 of the ratchet disk, as soon as the cam disk reaches the end of its movement, under the action of the spring 189.

While the cam follower roll rides on the cam 198 the gate 159 remains in closing position, and no further units are admitted to the sockets of the presenting wheel 118 until the follower roll 168 runs off of the cam 198. This cam 198 may be of any desired length so that under different conditions the presenting wheel 118 may make a fraction of a revolution or more than a complete revolution without receiving any fastener units, in accordance with the length of the cam 198. Likewise the length of the successive series of fastener units is dependent upon the distance through which the cam wheel 169 turns before it is released and permitted to return to its starting position, this being dependent on the position of the block 194 in the slot 193 as above described.

While I have herein described a desirable embodiment of the invention by way of example, I wish it to be understood that equivalent devices and combinations of parts may be substituted for those herein specifically described without departing from the spirit of the invention.

I claim:

1. A machine of the class described comprising stringer tape feeding means operative uninterruptedly to move a stringer tape step-by-step longitudinally at a substantially uniform rate, uninterruptedly acting unit-presenting means including a rotary unit carrier operative to deliver units one after another in position to be secured to the stringer tape, and unit supply means normally operative to deliver units in uninterrupted succession to the presenting means, said supply means including delivery interrupting means operative at regular intervals to intermit the delivery of units to the presenting means for a predetermined period while the rotary unit carrier continues to turn thereby to separate the units into distinct spaced series.

2. A machine of the class described comprising stringer tape feeding means operative uninterruptedly to move a stringer tape step-by-step longitudinally at a substantially uniform rate, uninterruptedly acting unit-presenting means including a rotary unit carrier operative to deliver units one after another in position to be secured to the stringer tape, unit supply means comprising a guideway for leading units to the presenting means, said guideway normally being unobstructed to permit free passage of a series of units and means operative at predetermined intervals to interrupt the passage of units along said guideway.

3. A machine of the class described comprising stringer tape feeding means operative uninterruptedly to move a stringer tape step-by-step longitudinally at a substantially uniform rate, uninterruptedly acting unit-presenting means, including a movable unit carrier which always moves in the same direction, operative to deliver units one after another in position to be secured to the stringer tape, unit supply means comprising a guideway for leading units to the presenting means, a gate member movable into and out of the path of units passing along said guideway, means holding said gate member stationary and wholly out of the path of units moving along said guideway while a predetermined number of units greater than one is passing the gate member, and means operative at predetermined intervals to move the gate into said path thereby to interrupt the delivery of units to the presenting means.

4. A machine of the class described comprising stringer tape feeding means operative uninterruptedly to move a stringer tape step-by-step longitudinally at a substantially uniform rate, uninterruptedly acting unit-presenting means comprising a rotary unit-carrier operative to deliver units one after another in position to be secured to the stringer tape, and unit supply means operative to deliver units to the unit-carrier, said supply means comprising mechanism operative automatically to intermit the delivery of units to the unit-carrier for a period of predetermined duration.

5. A machine of the class described comprising stringer tape feeding means operative uninterruptedly to move a stringer tape step-by-step longitudinally in a substantially vertical path at a substantially uniform rate, uninterruptedly acting unit-presenting means, an endless movable unit carrier, means moving said unit carrier step by step always in the same direction, said carrier being operative to deliver units one after another in position to be secured to the stringer tape, and unit supply means operative to deliver units to the movable unit-carrier, said supply means comprising mechanism including adjustable timing means operative to intermit the delivery of units to the movable unit-carrier for predetermined periods of time of adjustably variable duration.

6. A machine of the class described comprising stringer tape feeding means operative uninterruptedly to move a stringer tape step-by-step longitudinally at a substantially uniform rate, means operative to deliver units successively in position to be attached to the tape, and means operative to intermit attachment of units to the tape, said intermitting means comprising a timer mechanism including a rotary timer wheel, a ratchet wheel coaxial with the timer wheel, a constantly acting pawl operative to drive the ratchet wheel always in the same direction, clutch means operative to unite the timer wheel to the ratchet wheel, means, including a normally stationary but adjustable clutch retractor element, operative after a predetermined forward movement of the timer wheel to release the clutch means thereby to disconnect the wheels, and spring means operative to restore the timer wheel to starting position.

7. A machine of the class described comprising stringer tape feeding means operative uninterruptedly to move a stringer tape step-by-step longitudinally at a substantially uniform rate, means operative to deliver units successively in position to be attached to the tape, and means operative to intermit attachment of units to the tape, said intermitting means comprising a timer mechanism including a rotary timer wheel, a ratchet wheel coaxial with the timer wheel, a constantly acting pawl operative to drive the ratchet wheel always in the same direction, clutch means operative to unite the timer wheel to the ratchet wheel, adjustable clutch release means operative at the end of a selected predetermined period of forward movement of the timer wheel to disengage the clutch means, means operative to reverse the timer wheel when so disengaged and restore it to starting position, and means operative to prevent rebound of the timer wheel as it returns to normal position.

8. A machine of the class described comprising stringer tape feeding means operative uninterruptedly to move a stringer tape step-by-step longitudinally at a substantially uniform rate, means operative to deliver units successively in position to be attached to the tape, a gate operative at intervals to interrupt delivery of units, and gate-controlling means comprising a timer mechanism including index means operative to show the extent of tape to which units are to be secured, a normally fixed, but adjustable stop element associated with said index means, a timer element carrying a rotary gate-closing cam having an active face whose extent is directly related to the length of time during which the gate should remain closed, means for moving said timer element whereby after a predetermined interval the entire cam is removed from gate-closing position, and means, including the aforesaid stop element, operative after a further interval of time, dependent upon the adjustment of said stop element, to restore the timer element with its cam to initial position.

9. A machine of the class described comprising stringer tape feeding means operative uninterruptedly to move a stringer tape step-by-step longitudinally at a substantially uniform rate, means operative to deliver units successively in position to be attached to the tape, a gate operative at intervals to interrupt delivery of units, and gate-controlling means comprising a timer mechanism including a rotary timer wheel carrying an elongate gate-closing cam of a peripheral extent directly related to the desired duration of time in which the gate shall remain closed, a ratchet wheel coaxial with said timer wheel, a constantly acting pawl operative to drive the ratchet wheel step-by-step always in the same direction, clutch means normally operative to connect the timer wheel to the ratchet wheel, adjustable clutch release means operative after a predetermined period of rotation of the timer wheel to disconnect the latter from the ratchet wheel, spring means operative to turn the timer wheel reversely and restore it quickly to starting position when so released, stop means operative to prevent over-travel of the timer wheel in reversing, and a gate-actuating element cooperable with the cam on the timer wheel when the latter is in starting position, thereby to close the gate and prevent further delivery of units until the forward movement of the timer wheel has carried the cam out of cooperative relation to said gate-actuating element.

10. In a machine for securing fastener units, having divergent jaws, in series to a beaded stringer tape, in combination, unit-presenting means operative to dispose successive units with their jaws in straddling relation to one edge of the tape, a tape-presenting member having a surface for engagement with the bead of the tape and a narrow slot perpendicular to said surface for the reception of the body of the tape, a slide supporting said positioning member, the slide being movable in a path substantially perpendicular to the beaded edge of the tape, and spring means urging the slide in a direction such that the bead-engaging surface of the positioning member tends to move the edge bead of the tape toward the point of divergence of the jaws of a unit so disposed.

11. In a machine for securing fastener units, having divergent jaws, in series to a beaded stringer tape, in combination, unit-presenting means operative to dispose successive units in an attaching position in which the jaws of a unit straddle one edge of the tape, a tape-positioning member comprising an element engageable with the bead of the tape adjacent to the junction of the bead with the body of the tape, a slide supporting said positioning member, and means urging the slide in a direction such that the bead-engaging element of the positioning member tends to move the edge bead of the tape toward the point of divergence of the jaws of the unit to be attached.

12. In a machine for securing fastener units, having divergent jaws, in series to a stringer tape, in combination, means for moving the tape longitudinally in taut condition along a predetermined path past a unit-attaching point, unit-presenting means comprising a rotary carrier, said carrier having a series of peripherally and uniformly spaced radial sockets each arranged to receive a unit so disposed that its jaws project outwardly from the axis of rotation, mechanism operative to move the tape intermittently past the attaching point and to move the carrier intermittently at a peripheral speed substantially equal to the linear velocity of the tape, and unit delivery means to deliver units into the sockets of the carrier, said delivery means comprising intermittently acting control devices operative to permit delivery of units to successive sockets of the carrier during a predetermined interval of time, and then during a following interval to prevent delivery of units to the carrier.

13. In a machine for securing fastener units, having divergent jaws, in series to a stringer tape, in combination, means for moving the tape longitudinally in taut condition along a predetermined path past a unit-attaching point, unit-presenting means comprising a rotary carrier, said carrier comprising a disk whose periphery is in substantially tangential relation to the edge of the tape adjacent to the attaching point and which has a substantially radial socket arranged to hold a unit so disposed that its jaws project away from the axis of rotation and diverge toward opposite sides of the disk, unit delivery means operative to deliver a unit into the socket of the carrier disk when such socket is at substantially 270° away from the attaching point, guard means concentric with the disk operative to prevent escape of a unit from the socket as the socket moves from the delivery to the attaching point, and means operative at the attaching point to force the jaws of a unit, held in the socket, against the margin of the tape.

14. In a machine for securing fastener units, having divergent jaws, in spaced series to a stringer tape, unit-presenting means comprising an endless carrier having holding means for the reception of units, feed mechanism operative to advance the carrier intermittently, means operative to advance the tape longitudinally and intermittently at substantially the same linear rate as the carrier, means operative to deliver units one after another in succession to the holders of the carrier, and means operative to interrupt such delivery of units for predetermined equally spaced intervals of time while the tape and carrier continue to advance through a distance exceeding that which separates units of a given series.

15. In a machine for securing fastener units, having divergent jaws, in spaced series to a stringer tape, unit-presenting means comprising an endless carrier having sockets spaced substantially uniformly apart for the reception of units, feed means operative uninterruptedly to advance the carrier step-by-step, means, acting in time with the carrier feed means, operative uninterruptedly to advance the tape by steps substantially of the same length as those taken by the carrier, the path of the tape being substantially tangential to the path of the sockets of the carrier at a unit attaching point, delivery means for delivering units one after another to the successive sockets of the carrier at a point circumferentially spaced from the attaching point, a guard coaxial with the carrier and operative to prevent escape of units from the carrier sockets as the latter move from the delivery point to the attaching point, and reciprocating means at the attaching point operative to unite the unit to the tape.

16. In a machine for securing fastener units, having divergent jaws, in spaced series to a stringer tape, unit-presenting means comprising an endless carrier having sockets spaced substantially uniformly apart for the reception of units, feed means operative to advance the carrier step-by-step, means, acting in time with the carrier feed means, operative to advance the tape intermittently by steps substantially of the same length as those taken by the carrier, the path of the tape being substantially tangential to a portion of the path of the sockets of the carrier, means for delivering units one after another to the successive sockets of the carrier, and means operative to interrupt delivery of units to the sockets of the carrier for predetermined equally spaced intervals of time while continuing to advance the tape from the carrier.

17. In a machine for securing fastener units, having divergent jaws, in spaced series to a stringer tape, unit-presenting means comprising an endless carrier having a series of sockets each adapted to hold a unit, means operative to advance the carrier step-by-step, each step being substantially equal in length to the spaces between sockets, means operative at a predetermined point in the path of said sockets to deliver units one by one into successive sockets of the carrier, and a guard extending along the path of said sockets from the point at which the units are placed in the sockets to a point of delivery of the units from the sockets.

18. In a machine for securing fastener units, having divergent jaws, in spaced series to a stringer tape, unit-presenting means comprising a rotary circular carrier having a series of uniformly spaced sockets for units, means for turning the carrier step-by-step intermittently, each step substantially equalling the distance between sockets, means operative to deliver a unit into each socket as the latter reaches a predetermined point, a guard extending along the periphery of the carrier and arranged to prevent escape of units from the sockets in which they have been placed, and means adjacent to the end of said guard operative to remove units from their sockets.

19. In a machine for securing fastener units, having divergent jaws, in spaced series to a stringer tape, unit-presenting means comprising a rotary circular carrier turning about a substantially horizontal axis, said carrier having a series of peripherally spaced unit-receiving sockets, means operative to turn the carrier step-by-step intermittently, each step substantially equalling the distance between sockets, means operative to drop units, each with its jaws directed upwardly, one by one in succession into the sockets as the latter reach substantially the uppermost point in their path of travel, a guard element concentric with the carrier and extending substantially from the point at which the units are received in the socket to a point substantially removed therefrom peripherally of the carrier, said guard element being arranged to prevent units from escaping from the sockets as the sockets move downwardly from the receiving point, and means adjacent to the terminus of the guard element operative to remove units from the sockets in the carrier.

20. In a machine for securing fastener units, having divergent jaws, in spaced series to a stringer tape, unit-presenting means comprising a rotary circular carrier turning about a substantially horizontal axis, said carrier having a series of peripherally spaced substantially radial unit-receiving sockets, means operative to turn the carrier step-by-step intermittently, means operative to drop units, each with its jaws directed upwardly, one by one in succession into the sockets as the latter reach substantially the uppermost point in their path of travel, a guard element concentric with the carrier and extending from adjacent to the upper point in the socket path, where the units are received, to a point in the socket path at which the jaws of the units are disposed substantially in a horizontal plane, and means adjacent to said latter point operative to remove the units from the sockets.

21. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a container for units disposed indiscriminately in mass, a rotary picker device operative by engagement with the projecting pins of individual units to separate such units one by one from the mass and move them along a predetermined path to a delivery point, and guide means operative to convey units, each with its pin and socket end in advance, to the presenting means.

22. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a container for units disposed indiscriminately in mass, a rotary picker disk having slots in its radial face, each of a width to receive the projecting pin of a unit, means cooperating with said disk to provide an arcuate path of a thickness just sufficient to accommodate the body of a unit whose pin is seated in a slot in the disk, and guide means leading from the delivery end of said arcuate path to the presenting means.

23. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a receptacle for units disposed indiscriminately in mass, a selecting mechanism, means for conveying indiscriminately disposed units gradually from the receptacle to the selecting mechanism, the latter including a container of truncated conical shape, a rotary picker disk coaxial with the container and closing the larger end of the latter, said disk having a series of slots in its inner radial face each of a width to accommodate the projecting pin of a unit, the container having a radial surface closely adjacent to the radial slotted face of the disk and provided with an arcuate groove of a thickness just sufficient to accommodate the body of a unit whose pin is seated in a slot of the disk, means to rotate the disk, and guide means arranged to receive units delivered from the end of said arcuate groove.

24. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a supply receptacle for units disposed indiscriminately in mass, a container for units, a conduit for conveying units from the receptacle to the container, and a moving picker device operative, by engagement with the pins of units within the container, successively to remove units from the container and to dispose them in series, each unit with its pin-end in advance.

25. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a supply receptacle for units disposed indiscriminately in mass, said receptacle having a slightly inclined floor, a container for units, a conduit leading from the lower part of the receptacle floor to the container, and picker means associated with the container, said picker means being operative, by engagement with the projecting pins of the units, to remove units successively from the container.

26. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a container for units disposed indiscriminately in mass, a rotary picker device operative by engagement with the projecting pins of individual units to separate such units one by one from the mass and move them along a predetermined path, unit-positioning means operative to engage units moving along said path and to orient such units so that, with certainty, each unit shall have its pin-end in advance, and means providing an arcuate guideway for the reception of units so oriented.

27. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a container for units disposed indiscriminately in mass, a rotary picker device associated with the container, said picker device being operative to engage units in the container, and, as the picker device turns, to separate individual units from the mass in the container and to move them along a predetermined path, said picker having slots operative to receive the projecting pins of the units and positively to impel along said path such units as have their pins within the picker slots.

28. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a container for units disposed indiscriminately in mass, a rotary picker device associated with the container, said picker device being operative to engage units in the container, and, as the picker device turns, to separate individual units from the mass in the container and to move them along a predetermined path, said picker having slots operative to receive the projecting pins of the units and positively to impel along said path such units as have their pins within the picker slots, and cam means operative to discharge from said path all those units, moving with the picker, whose pins are not so disposed in the picker slots.

29. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a container for units disposed indiscriminately in mass, a rotary picker device associated with the container, said picker device being operative to engage units in the container, and, as the picker device turns, to separate individual units from the mass in the container and to move them along a predetermined path, said picker having slots operative to receive the projecting pins of units and positively to impel along said path such units as have their pins within the picker slots, and adjustable cam means operative on units moving along said path so to orient units, whose pins are in the picker slots, as to cause them all to move with their pin-ends in advance, said cam being also operative to discharge from said path units whose pins are not disposed in the picker slots.

30. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a container for units disposed indiscriminately in mass, and a rotary picker device operative, by engagement with the projecting pins of individual units, to separate such units one by one from the mass and to move them along a predetermined path with their pin-ends in advance, said path comprising an arcuate portion having a downwardly directed sector along which the units pass with their pin-ends downward to a delivery point.

31. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a picker device operative by engagement with the projecting pins of individual units to separate the units one by one from the mass and to move them along a predetermined path in which their pin-ends are uppermost, and means providing a guideway along which the units travel, said guideway comprising a downwardly directed portion which so orients the units as they move along it that their pin-ends are directed downwardly.

CONSTANT A. MISEREZ.

DISCLAIMER 2,080,984.—*Constant A. Miserez*, Montreal, Quebec, Canada. APPARATUS FOR ATTACHING FASTENERS. Patent dated May 18, 1937. Disclaimer filed December 22, 1937, by the assignee, *Talon, Inc.*

Hereby disclaims claims 17 and 18 from the scope of said Letters Patent.

[*Official Gazette January 18, 1938.*]

receive the projecting pins of the units and positively to impel along said path such units as have their pins within the picker slots.

28. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a container for units disposed indiscriminately in mass, a rotary picker device associated with the container, said picker device being operative to engage units in the container, and, as the picker device turns, to separate individual units from the mass in the container and to move them along a predetermined path, said picker having slots operative to receive the projecting pins of the units and positively to impel along said path such units as have their pins within the picker slots, and cam means operative to discharge from said path all those units, moving with the picker, whose pins are not so disposed in the picker slots.

29. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a container for units disposed indiscriminately in mass, a rotary picker device associated with the container, said picker device being operative to engage units in the container, and, as the picker device turns, to separate individual units from the mass in the container and to move them along a predetermined path, said picker having slots operative to receive the projecting pins of units and positively to impel along said path such units as have their pins within the picker slots, and adjustable cam means operative on units moving along said path so to orient units, whose pins are in the picker slots, as to cause them all to move with their pin-ends in advance, said cam being also operative to discharge from said path units whose pins are not disposed in the picker slots.

30. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a container for units disposed indiscriminately in mass, and a rotary picker device operative, by engagement with the projecting pins of individual units, to separate such units one by one from the mass and to move them along a predetermined path with their pin-ends in advance, said path comprising an arcuate portion having a downwardly directed sector along which the units pass with their pin-ends downward to a delivery point.

31. In a machine for securing fastener units to a stringer tape, said units being of the kind having divergent jaws at one end and a projecting pin and a socket adjacent to the other end, in combination, tape feeding means, unit-presenting means, and unit supply means, the unit supply means comprising a picker device operative by engagement with the projecting pins of individual units to separate the units one by one from the mass and to move them along a predetermined path in which their pin-ends are uppermost, and means providing a guideway along which the units travel, said guideway comprising a downwardly directed portion which so orients the units as they move along it that their pin-ends are directed downwardly.

CONSTANT A. MISEREZ.

DISCLAIMER 2,080,984.—*Constant A. Miserez*, Montreal, Quebec, Canada. APPARATUS FOR ATTACHING FASTENERS. Patent dated May 18, 1937. Disclaimer filed December 22, 1937, by the assignee, *Talon, Inc.*

Hereby disclaims claims 17 and 18 from the scope of said Letters Patent.

[*Official Gazette January 18, 1938.*]

DISCLAIMER 2,080,984.—*Constant A. Miserez*, Montreal, Quebec, Canada. APPARATUS FOR ATTACHING FASTENERS. Patent dated May 18, 1937. Disclaimer filed December 22, 1937, by the assignee, *Talon, Inc.*

Hereby disclaims claims 17 and 18 from the scope of said Letters Patent.

[*Official Gazette January 18, 1938.*]